(12) United States Patent
Seyfried et al.

(10) Patent No.: US 7,391,000 B2
(45) Date of Patent: Jun. 24, 2008

(54) EMCCD DETECTOR, AS WELL AS A SPECTROMETER AND A MICROSCOPE HAVING AN EMCCD DETECTOR

(75) Inventors: Volker Seyfried, Nussloch (DE); Frank Schreiber, Dossenheim (DE)

(73) Assignee: Leica Microsystems CMS GmbH, Wetzlar (DE)

( * ) Notice: Subject to any disclaimer, the term of this patent is extended or adjusted under 35 U.S.C. 154(b) by 36 days.

(21) Appl. No.: 11/251,685

(22) Filed: Oct. 17, 2005

(65) Prior Publication Data

US 2006/0081769 A1    Apr. 20, 2006

Related U.S. Application Data

(60) Provisional application No. 60/650,282, filed on Feb. 4, 2005.

(30) Foreign Application Priority Data

Oct. 20, 2004    (DE) .................. 10 2004 051 201

(51) Int. Cl.
 *H01L 40/14*    (2006.01)
 *B01D 59/44*    (2006.01)
 *G01J 3/44*    (2006.01)

(52) U.S. Cl. .................. 250/207; 250/282; 356/301

(58) Field of Classification Search .............. 250/458.1, 250/586, 214 R, 216, 221, 222.1, 207, 214.1, 250/282, 290, 292; 359/487, 577, 578; 356/300, 356/318, 301

See application file for complete search history.

(56) References Cited

U.S. PATENT DOCUMENTS

2004/0252300 A1 * 12/2004  Slater .................... 356/318
2005/0092943 A1 *  5/2005  Nitsche et al. .......... 250/586
2006/0215264 A1 *  9/2006  Birk et al. .............. 359/487

FOREIGN PATENT DOCUMENTS

EP    0866501    9/1998

OTHER PUBLICATIONS

Colin G. Coates et al. "Ultra-sensitivity, speed and resolution. Optimizing low-light microscopy with the back-illuminated electron multiplying CCD", Proceedings of SPIE-OSA Biometrical Optics, SPIE vol. 5139, 2003, XP-002365051, pp. 56-66, Inc. abstract XP-002366851.

Colin G. Coates et al. "Back-illuminated electron multiplying technology. The world's most sensitive CCD for ultra low-light microscopy", Proceedings of SPIE vol. 4962, 2003, XP-002365052, pp. 319-328, incl. abstract XP-002366852.

* cited by examiner

*Primary Examiner*—Georgia Y. Epps
*Assistant Examiner*—Don Williams
(74) *Attorney, Agent, or Firm*—Darby & Darby

(57) ABSTRACT

An EMCCD detector includes a first gain register and a photoactive area divided into at least a two detection regions. At least one of the detection regions is assigned to the first gain register.

16 Claims, 4 Drawing Sheets

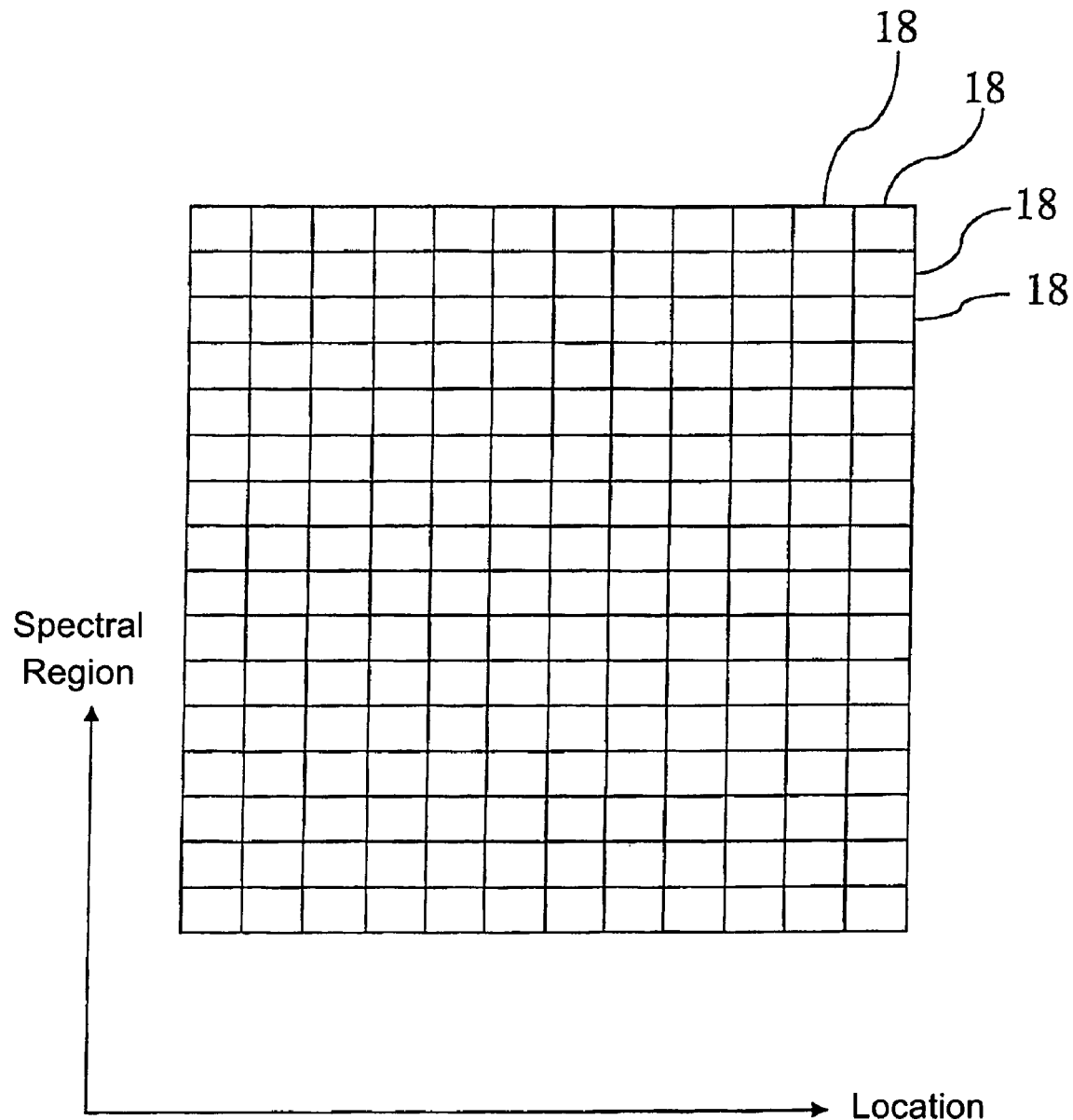

EMCCD DETECTOR, AS WELL AS A SPECTROMETER AND A MICROSCOPE HAVING AN EMCCD DETECTOR

Priority is claimed to provisional application no. 60/650,282 and to German patent application DE 10 2004 051 201.9, the entire subject matters of both of which are hereby incorporated by reference herein.

The present invention relates to an EMCCD detector, especially for detection of light in a microscope, having a photoactive area and a gain register. The present invention is also directed to a spectrometer and a microscope having such an EMCCD detector.

BACKGROUND

EMCCD detectors having a photoactive area and a gain register are known in the field. These are a special type of charge-coupled device (CCD) detector; "EM" standing for "electron multiplying".

In conventional CCD detectors, each photon releases one electron when striking a photoactive layer of the CCD detector; the electron then being trapped in one of a plurality of so-called "potential wells", where it remains until read-out. During the actual read-out operation, the potential wells are controlled by application of voltages in such a way that the electrons are transferred from their current potential well to the respective next potential well in a "bucket-brigade" fashion until they finally reach a digitization stage. In this process, however, the read-out noise is so high—at least about 20 electrons—that single electrons, and thus single photons, cannot be distinguished from the noise or detected individually. Therefore, conventional CCD detectors cannot be used for standard confocal microscopes.

Like conventional CCD detectors, EMCCD detectors have a photoactive area and, in addition thereto, a gain register to form an amplifier path between the shift register and the output amplifier. Amplification in the amplifier path is accomplished by electron multiplication in a similar manner as in an avalanche diode. Electrons are accelerated by a high voltage to such a degree that they are able to release other electrons by ionization collisions and thus to initiate an electron avalanche. In other words, EMCCD detectors have special potential wells in the form of gain registers, in which the charge transfer in the bucket brigade takes place at such a speed and force that further electrons are generated by electron collision. The further electrons are now themselves transported and accelerated, and release electrons as well. However, the gain factor is quite small, so that a great number of gain stages—usually about 400—need to be passed through to obtain an appreciable gain. When there is sufficient gain, the primary electron finally initiates such an electron avalanche that the number of secondary electrons exceeds the usual read-out noise, thus eventually allowing detection of single photons. In this respect, the EMCCD detectors are similar to the photomultipliers normally used in confocal microscopy, but, for example in the case of the back-illuminated type, they have three times as high a quantum efficiency than the best photomultipliers.

However, the conventional EMCCD detectors are problematic in that their read-out rate is not sufficient for spectral confocal microscopy. Therefore, it has not been possible so far to use EMCCD detectors in applications of spectral confocal microscopy.

SUMMARY OF THE INVENTION

It is therefore an object of the present invention to provide an EMCCD detector, as well as a spectrometer and a microscope, including a photoactive area and a gain register, whereby the use in applications of spectral confocal microscopy with high readout rates is made possible with structurally simple means.

The present invention provides an EMCCD including a photoactive area and a gain register, wherein the photoactive area is divided into at least two detection regions, and that a specifiable number or group, or number of groups, of detection regions are each assigned at least one separate gain register.

In accordance with the present invention, it was initially discovered that, in spite of read-out rate of conventional EMCCD detectors achieved so far, which is too low for spectral confocal microscopy, these EMCCD detectors can advantageously be used also in applications of spectral confocal microscopy if the EMCCD detector is appropriately designed. To this end, in accordance with the present invention, the EMCCD detector is designed such that the photoactive area is divided into at least two detection regions. These at least two detection regions are then suitably assigned separate gain registers, so that electrons generated in the respective detection regions may be amplified separately, if desired. This avoids the bottleneck of conventional EMCCD detectors, which have only one gain register for all electrons generated. In other words, in the EMCCD detector of the present invention, a plurality of such bottlenecks are connected in parallel. This allows the individual detection regions to be read out separately. In this instance, a specifiable number or group, or number of groups, of detection regions are assigned at least one separate gain register.

Therefore, the EMCCD detector provided by the present invention is a detector whereby the use in applications of spectral confocal microscopy with high readout rates is made possible with structurally simple means.

With a view to a particularly high readout rate, each detection region could be assigned at least one separate gain register. In this instance, therefore, the detector then has at least the same number of gain registers as detection regions.

In a detector embodiment having a less complex design, two detection regions could be assigned at least one separate gain register. In this instance, two detection regions could be combined, that is, the released electrons of two detection regions could be further processed by one gain register. In this instance, it is also conceivable to assign at least one separate gain register to each two detection regions, in which case all detection regions could be divided into groups of two, each of which is then assigned at least one separate gain register.

To simplify the design and in the case of reduced requirements on the detection rate, it would, in principle, be possible to assign a common, or shared, gain register to a plurality of detection regions. Depending on the requirements, it would be possible, for example, to assign a third detection region to a gain register provided for the first or second detection region. As a general principle, the assignment of the gain registers to the detection regions should be geared to the particular application.

The detection regions have in common that, when struck by light, each of them generates one electrical signal; the electrical signals being amplified by the gain registers.

In an embodiment of particularly simple design, the detector could be designed, as it were, as a point detector. In another embodiment, the detector could be a one-dimensional detector; an embodiment as a line detector being particularly advantageous here. In particular, such a line detector could detect a spectrally separated light beam in a spectrally selective manner. To this end, the light beam could be imaged into a focal line on the line detector. The embodiment as a line detector is advantageous especially when using the detector in spectral confocal microscopy.

In a further embodiment, the detector could be a two-dimensional detector, in which the detection regions could be provided as a surface. Such a surface could be flat, but a curved surface is conceivable as well. In another embodiment, the detector could be a three-dimensional detector.

In particular in the case of a one-dimensional detector design, and particularly when embodied as a line detector, the gain registers could be disposed substantially perpendicular to a straight line running through the detection regions. This ensures a particularly compact detector design.

With a view to a particularly individual and universal embodiment of the detector, different gain registers could have different gains or gain factors. Moreover, in this case, at least one gain register, and preferably all gain registers, could each advantageously have an individually adjustable gain, or an individually adjustable gain factor. This would provide individual adaptability to the most diverse applications.

Alternatively or additionally, several, and preferably all, of the gain registers could have a jointly adjustable gain, or a jointly adjustable gain factor, depending on the requirements. This would provide simplified adjustability in terms of gain or gain factor.

With a view to a particularly reliable processing of the electrical signals generated by the detector, a preferably parallel-processing electronic processing circuit, preferably an field-programmable gate array (FPGA), could be provided. Moreover, the electronic processing circuit could be designed in an individual and advantageous manner for intelligent evaluation, which, for example, in a microscopy application, would allow direct association of detection signals with, for example, a dye present in the sample.

With a view to particularly high sensitivity and quantum efficiency, the detector could be designed for back-illuminated operation. This would eliminate the need for the illumination to pass through processing and/or feeding electronic structures of the detector before it is detected. Ultimately, therefore, no loss of quantum efficiency is to be expected.

In an alternative embodiment, the detector could be designed for front-illuminated operation. With regard to the illumination side, consideration should be given to the particular application.

In one embodiment of the detector, the generated detection signals of several detection regions could be able to be added together. Such an addition could be provided or not, depending on the desired measurement result.

Moreover, the detection regions could advantageously have different sizes. Especially when a spectrally separated light beam is present, such a design is convenient if the particular spectral separation device used produces a nonlinear separation. Nonlinear separation is understood here to mean that the angular deflection by a dispersive element, such as a prism, is not proportional to the wavelength. For example, the lines in the blue region of the spectrum are spatially closer together than in the red spectral region. In the case of detection regions of different size, a linearization could be achieved if the size of the detection regions is appropriately selected.

Depending on the particular application, for example, when using a linearly separating dispersive element, the detection regions could be equal in size. "Equal" as used herein is not limited to exactly equal, but includes substantially and generally equal.

In order to achieve a detector that is particularly easy to operate, the detector could take the form of a chip or module, or be incorporated in a chip or module. In this manner, mechanical moving parts of an EMCCD detector could be avoided, thus minimizing service and maintenance requirements. Accordingly, the adjustment and calibration of an EMCCD detector designed in this manner is correspondingly simple.

The present invention also provides a spectrometer having an EMCCD detector according to the present invention as described above. Such a spectrometer could advantageously be equipped with an EMCCD detector in the form of a line detector; a dispersive optical element being present as well, and a light beam that is spatially and spectrally separated by the element being imaged into a focal line on the line detector. A spectrometer of this type could be used advantageously in applications of spectral confocal microscopy.

Moreover, the present invention also provides a microscope, in particular a scanning or confocal scanning microscope, having an EMCCD detector according to the present invention as described above. Such a microscope could advantageously be further refined in such a manner that the EMCCD detector forms part of a spectrometer and/or a multi-band detector.

With regard to the discussion of the advantages of particular embodiments of the inventive EMCCD detector in connection with the inventive spectrometer or the inventive microscope, reference is made to the above description of these advantages in order to avoid repetitions.

The EMCCD detector of the present invention could replace photomultipliers in many applications. If designed appropriately, the quantum efficiency could be three times as high as in photomultipliers.

BRIEF DESCRIPTION OF THE DRAWINGS

The teaching of the present invention can be embodied and refined in different ways. In this regard, reference is made to the following description of exemplary embodiments of the inventive teaching with reference to the drawings. In conjunction with the explanation of the exemplary embodiments of the inventive teaching with reference to the drawings, an explanation is also given of embodiments and developments of the teaching.

FIG. 4 is a schematic plan view of a further exemplary embodiment of an inventive EMCCD detector, in which the detector regions are arranged in a flat configuration.

DETAILED DESCRIPTION

Figure 1:
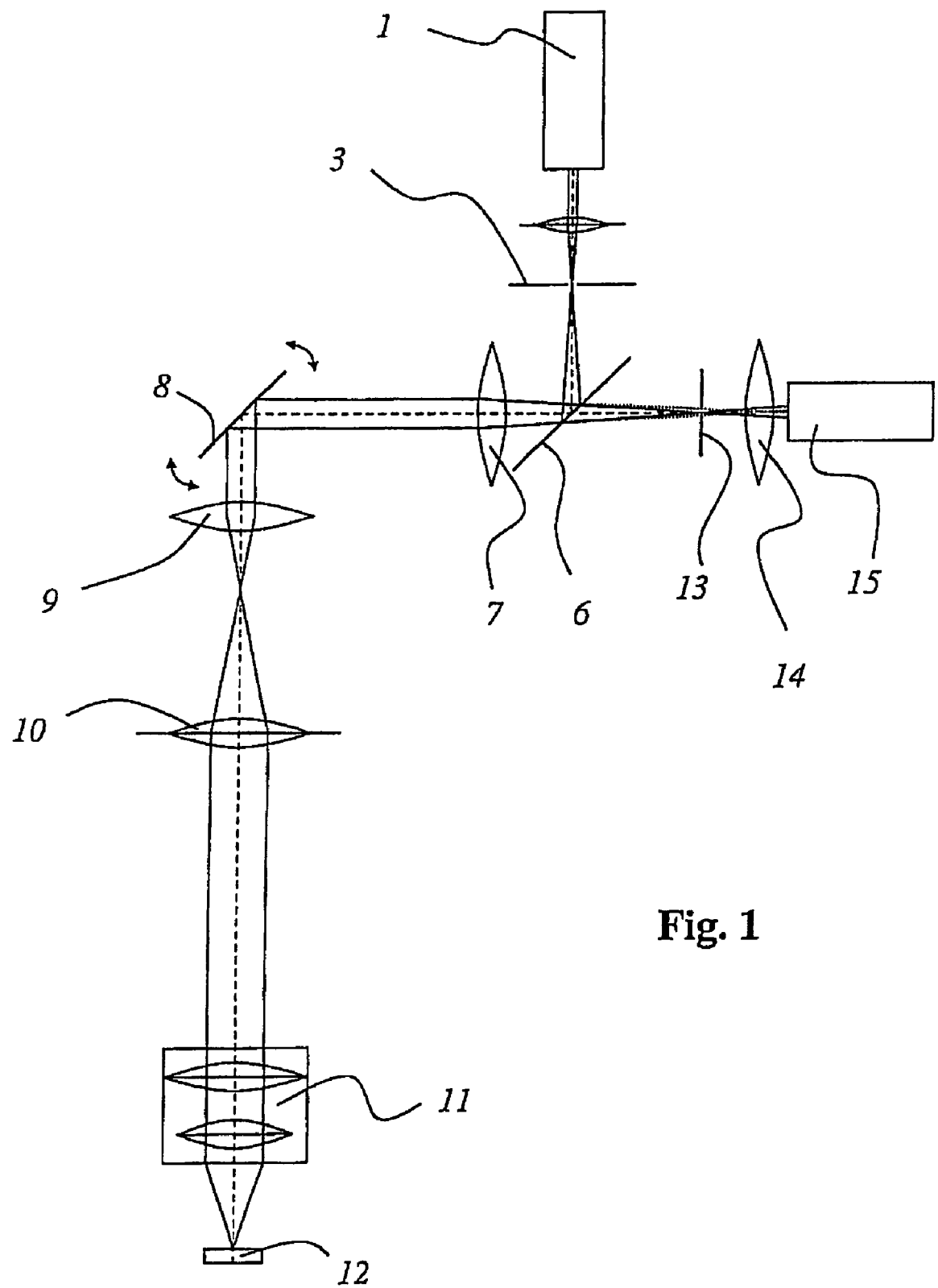
FIG. 1 is a schematic view of a scanning microscope, including an exemplary embodiment of an EMCCD detector according to the present invention.

FIG. 1 is a schematic plan view of a scanning microscope having a laser 1 for generating an illuminating light beam. The illuminating light beam is directed via a pinhole 3, a beam splitter 6, an optical element 7, a scanning mirror 8, an optical element 9, an optical element 10, and an optical system 11 onto a sample 12. The illuminating light beam is reflected from sample 12 back to scanning mirror 8 and beam splitter 6, and is then directed through a pinhole 13 to an optical system 14 and an EMCCD detector 15 for detection of light.

Figure 2:
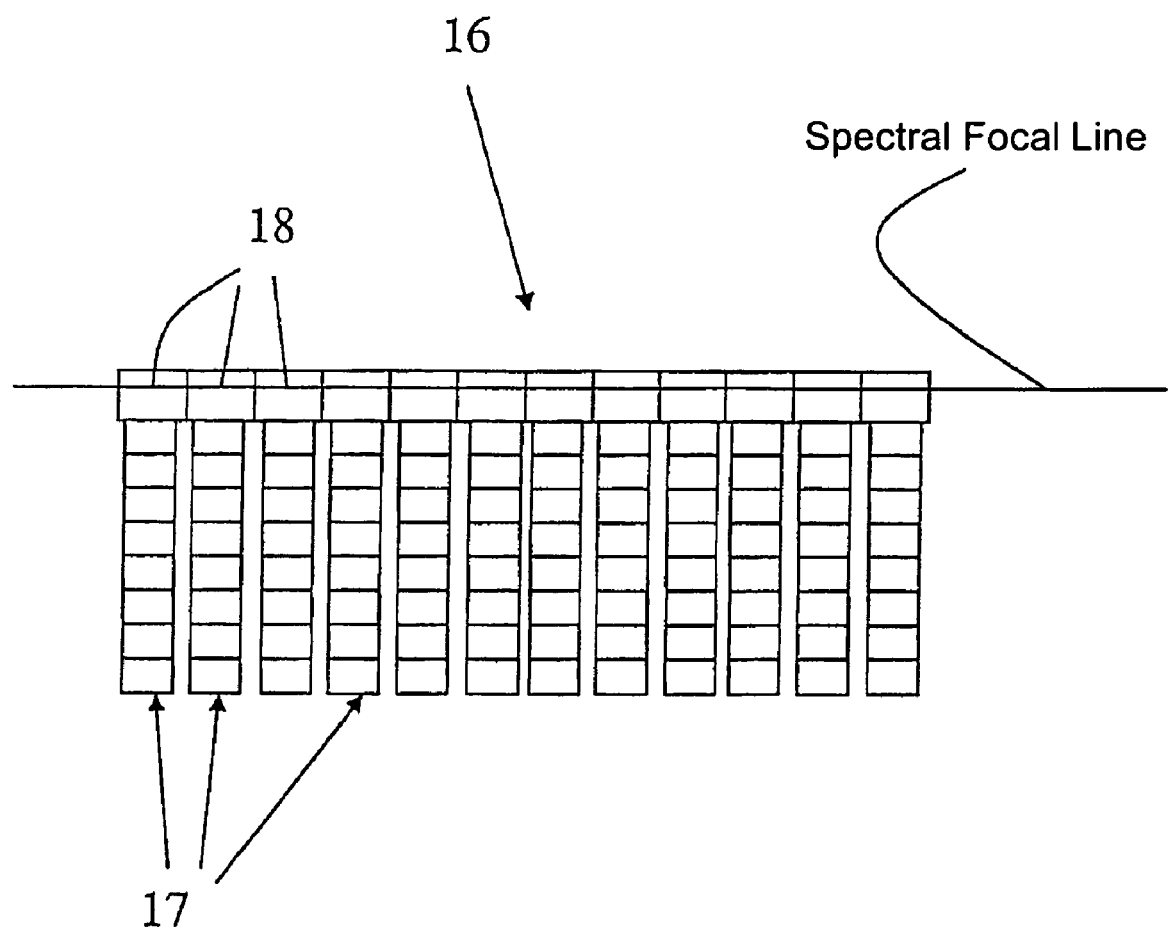
FIG. 2 is a schematic side view of the exemplary embodiment of an EMCCD detector of FIG. 1, which, in this case, is a line detector.

FIG. 2 is a schematic side view of an exemplary embodiment of an inventive EMCCD detector 15 in the form of a line detector. Detector 15 has a photoactive area 16 and a plurality of gain registers 17. This photoactive area 16 is divided into a plurality of detection regions 18; each detection region 18 being assigned at least one separate gain register 17. Such a design makes it possible to achieve a particularly high readout rate. FIG. 2 shows a spectral focal line along which the detection light beam is spectrally separated by optical system 14 shown in FIG. 1. Here, gain registers 17 are disposed perpendicular to this straight line running through detection regions 18. "Perpendicular" as used herein is not limited to exactly perpendicular, but includes substantially and generally perpendicular.

Figure 3:
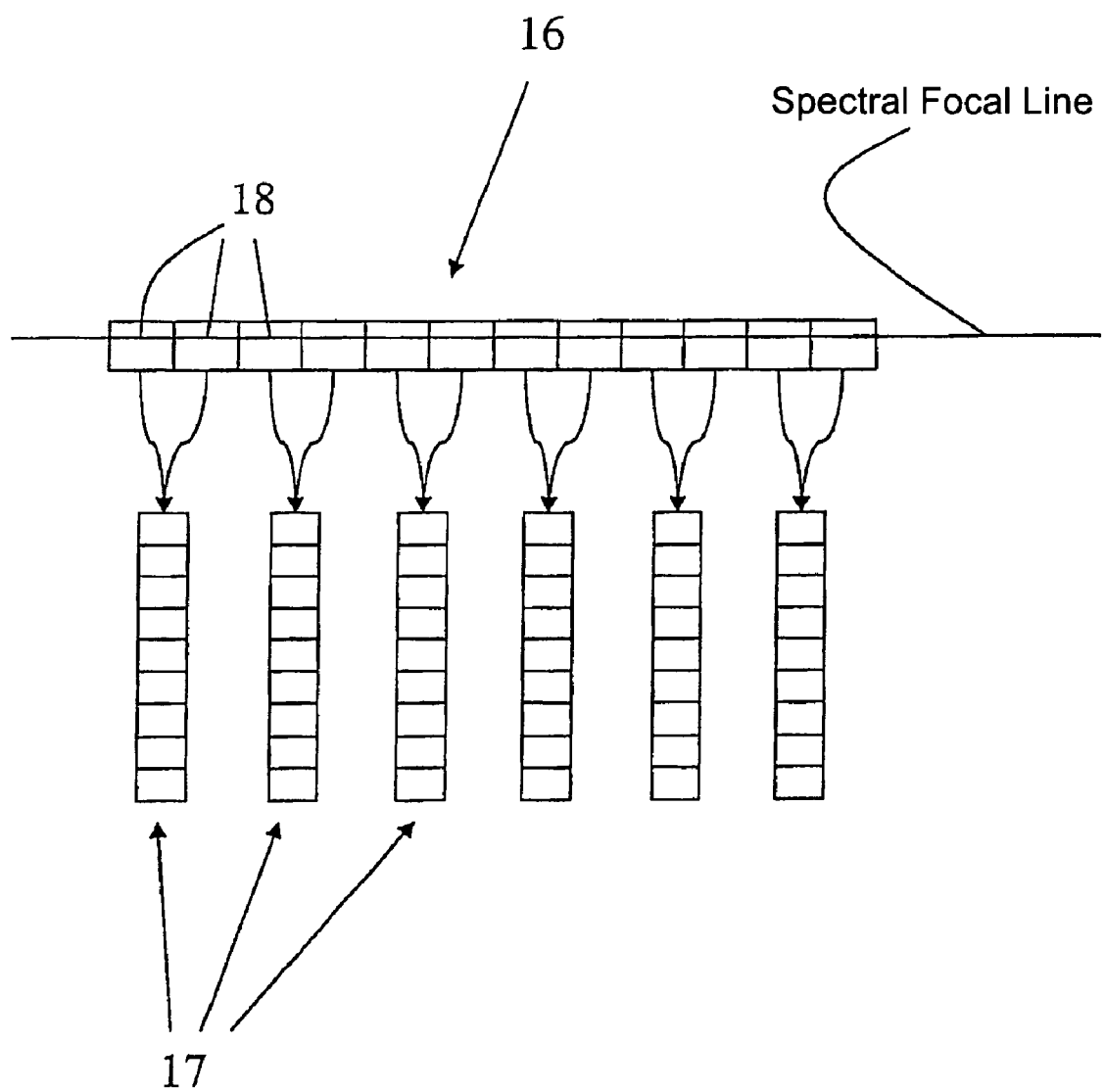
FIG. 3 is a schematic side view of a further exemplary embodiment of an inventive EMCCD detector, which, in this case, is also a line detector.

FIG. 3 is a schematic side view of a further exemplary embodiment of an EMCCD detector 15 according to the present invention. Detector 15 has a photoactive area 16, which is also divided into a plurality of detection regions 18. In the exemplary embodiment shown here, one gain register 17 is assigned to each two detection regions 18. Here too, the spectral focal line runs substantially perpendicular to gain registers 17.

FIG. 4 is a schematic plan view of a further exemplary embodiment of an EMCCD detector 15 according to the present invention. In this instance, photoactive area 16 is divided into a plurality of detection regions 18, which are flatly arranged in a coordinate system. This arrangement is suitable for a confocal line scanner. The coordinate system is divided by location and spectral region to be detected.

With regard to further advantageous embodiments of the inventive EMCCD detector, reference is made to the general portion of the specification in order to avoid repetitions.

Finally, it should be particularly noted that the exemplary embodiments described above serve merely for discussion of the claimed teaching without limiting it to the exemplary embodiments.

What is claimed is:

1. A spectrometer including an EMCCD detector comprising:
    a first gain register;
    a second gain register; and
    a photoactive area divided into at least a first and a second detection region, the first detection region being assigned to the first gain register and the second detection region being assigned to the second gain register,
    wherein the first and a second detection regions each have a respective different size, and
    wherein the EMCCD detector has a configuration of a line detector, and further comprising a dispersive optical element configured to spatially and spectrally separate a beam of light so as to enable an imaging of the beam into a focal line on the EMCCD detector.

2. The spectrometer as recited in claim 1 wherein the photoactive area is configured to detect light in a microscope.

3. The spectrometer as recited in claim 1 wherein the first gain register is a shared gain register.

4. The spectrometer as recited in claim 1 further comprising a third and a fourth detection region, and wherein third detection region is assigned to the first gain register and the fourth detection region is assigned to the second gain register.

5. The spectrometer as recited in claim 1 further comprising a third detection region assigned to the first gain register.

6. The spectrometer as recited in claim 1 wherein the first and second detection regions are each disposed in a configuration of a point detector.

7. The spectrometer as recited in claim 1 wherein the first and second detection regions are each disposed in a configuration of a one-dimensional detector.

8. The spectrometer as recited in claim 1 wherein the first and second detection regions are disposed in a configuration of a two-dimensional detector.

9. The spectrometer as recited in claim 1 wherein the first and second detection regions are disposed in a configuration of a three-dimensional detector.

10. The spectrometer as recited in claim 1 wherein the first and second detection regions are disposed along a line, the first and second gain registers being disposed perpendicular to the line.

11. The spectrometer as recited in claim 1 wherein the first and second gain registers have respective different gains or gain factors.

12. The spectrometer as recited in claim 1 wherein the first and second gain registers each have a respectively adjustable respective gain or gain factor.

13. The spectrometer as recited in claim 1 wherein the first and second gain registers have a jointly adjustable gain or gain factor.

14. The spectrometer as recited in claim 1 further comprising a parallel-processing electronic processing circuit configured to process generated electrical signals.

15. The spectrometer as recited in claim 1 further comprising a signal adding device configured to add together respective detection signals generated by the first and second detection regions.

16. The spectrometer as recited in claim 1 wherein the first gain register and the photoactive area are included in a chip or module.

* * * * *